(12) United States Patent
Uno

(10) Patent No.: US 10,243,466 B2
(45) Date of Patent: Mar. 26, 2019

(54) SWITCHING POWER SUPPLY APPARATUS AND ERROR CORRECTION METHOD

(71) Applicant: Murata Manufacturing Co., Ltd., Nagaokakyo-shi, Kyoto-fu (JP)

(72) Inventor: Yoshiyuki Uno, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 0 days.

(21) Appl. No.: 15/986,858

(22) Filed: May 23, 2018

(65) Prior Publication Data

US 2018/0269790 A1    Sep. 20, 2018

Related U.S. Application Data

(63) Continuation of application No. PCT/JP2016/081663, filed on Oct. 26, 2016.

(30) Foreign Application Priority Data

Nov. 30, 2015  (JP) .................. 2015-233105

(51) Int. Cl.
*H02M 3/158* (2006.01)
*H02M 1/08* (2006.01)
(Continued)

(52) U.S. Cl.
CPC .......... *H02M 3/1584* (2013.01); *H02M 1/08* (2013.01); *H02M 3/156* (2013.01); *H02M 3/157* (2013.01);
(Continued)

(58) Field of Classification Search
CPC . H02M 2003/1584; H02M 2003/1586; H02M 3/157; H02M 2001/0009
See application file for complete search history.

(56) References Cited

U.S. PATENT DOCUMENTS 6,144,194 A    11/2000  Varga
2005/0024035 A1    2/2005  Tabaian et al.
(Continued)

FOREIGN PATENT DOCUMENTS

JP    2-231926 A    9/1990
JP    2007-527685 A    9/2007
(Continued)

OTHER PUBLICATIONS

Official Communication issued in International Patent Application No. PCT/JP2016/081663, dated Nov. 29, 2016, 15 pages.

*Primary Examiner* — Harry R Behm
(74) *Attorney, Agent, or Firm* — Keating & Bennett, LLP

(57) ABSTRACT

In a switching power supply apparatus, a magnitude of an output current of a first converter, which has been detected in a state in which a second converter is stopped, is transmitted to a measurement tool and a magnitude of an output current of the second converter, which has been detected in a state in which the first converter is stopped, is transmitted to the measurement tool. Correction values determined by the measurement tool based on transmission contents are received and stored in a memory. A magnitude of the output current which is used for PWM control of the first converter and a magnitude of the output current which is used for PWM control of the second converter are respectively corrected with the correction values.

17 Claims, 4 Drawing Sheets

(51) Int. Cl.
   *H02M 3/156* (2006.01)
   *H02M 3/157* (2006.01)
   *H02M 1/00* (2006.01)

(52) U.S. Cl.
   CPC ............... *H02M 2001/0009* (2013.01); *H02M 2001/0025* (2013.01)

(56) References Cited

U.S. PATENT DOCUMENTS

| | | | | |
|---|---|---|---|---|
| 2009/0222224 A1* | 9/2009 | Lewis | ............... | H02S 50/10 |
| | | | | 702/64 |
| 2009/0262555 A1 | 10/2009 | Asuke et al. | | |
| 2010/0238060 A1* | 9/2010 | Nien | ............... | H02M 3/1584 |
| | | | | 341/155 |
| 2011/0221405 A1* | 9/2011 | Tang | ............... | H02M 3/156 |
| | | | | 323/234 |
| 2013/0249518 A1* | 9/2013 | Giannopoulos | ....... | H02M 3/156 |
| | | | | 323/284 |
| 2014/0100726 A1* | 4/2014 | Reynolds | ............... | B60W 10/08 |
| | | | | 701/22 |
| 2014/0145687 A1* | 5/2014 | Mauss | ............... | G05F 1/10 |
| | | | | 323/234 |
| 2014/0232420 A1* | 8/2014 | Luo | ............... | G06F 1/26 |
| | | | | 324/750.01 |
| 2014/0298094 A1* | 10/2014 | Aliberti | ............... | G06F 11/24 |
| | | | | 714/30 |
| 2015/0002112 A1* | 1/2015 | Tang | ............... | G01R 31/42 |
| | | | | 323/271 |
| 2015/0008890 A1* | 1/2015 | Sasao | ............... | H02M 1/08 |
| | | | | 323/271 |
| 2016/0033611 A1* | 2/2016 | Rahardjo | ............... | G01R 35/005 |
| | | | | 702/104 |

FOREIGN PATENT DOCUMENTS

| | | |
|---|---|---|
| JP | 2009-148032 A | 7/2009 |
| JP | 2009-261079 A | 11/2009 |
| JP | 2009-261135 A | 11/2009 |
| JP | 2014-99995 A | 5/2014 |

* cited by examiner

SWITCHING POWER SUPPLY APPARATUS AND ERROR CORRECTION METHOD

CROSS REFERENCE TO RELATED APPLICATIONS

This application claims the benefit of priority to Japanese Patent Application No. 2015-233105 filed on Nov. 30, 2015 and is a Continuation Application of PCT Application No. PCT/JP2016/081663 filed on Oct. 26, 2016. The entire contents of each application are hereby incorporated herein by reference.

BACKGROUND OF THE INVENTION

1. Field of the Invention

The present invention relates to a switching power supply apparatus including converters connected in parallel and an error correction method that is executed in the switching power supply apparatus.

2. Description of the Related Art

Japanese Unexamined Patent Application Publication No. 2009-261135 discloses a multi-phase type DC-to-DC converter. The multi-phase type DC-to-DC converter can increase a total output power by connecting a plurality of converters in parallel. Such a circuit has a risk that the lifetime of the converter with a high load factor is shortened when output currents of the respective converters are unbalanced. It is therefore important to control the multi-phase type DC-to-DC converter to make load factors of the respective converters uniform. For the control, a control method in which current detection circuits are respectively provided for the plurality of converters and magnitudes of currents detected by the respective current detection circuits are controlled so as to be equal to a common current target value has been known.

In the above-described control method, detection results by the respective current detection circuits vary due to variations in performances of individual components, and the like, in some cases. To cope with the variation, the following method can be considered. That is, before shipping from a factory, for example, correction values are calculated from the detection results of the output currents and the correction values are stored in a memory. Then, the current detection results are corrected using the stored correction values in actual usage. However, a multi-phase type boosting chopper circuit disclosed in Japanese Unexamined Patent Application Publication No. 2009-261135 can detect only the total output current of the plurality of converters. The same correction value is therefore used for the current detection circuits that are respectively provided for the plurality of converters. As a result, the variations in the detection results of the output currents of the respective converters cannot be separately corrected with high accuracy.

SUMMARY OF THE INVENTION

Preferred embodiments of the present invention provide switching power supply apparatuses and error correction methods capable of correcting variations in output currents for respective converters.

A switching power supply apparatus according to a preferred embodiment of the present invention includes a first converter and a second converter that are connected in parallel, an output voltage detector that detects a magnitude of an output voltage, a current target value generator that generates a current target value from an error between the magnitude of the output voltage, which is detected by the output voltage detector, and a voltage target value, a first output current detector that detects a magnitude of an output current of the first converter, a second output current detector that detects a magnitude of an output current of the second converter, a first controller that performs PWM control on the first converter so as to make the magnitude of the output current, which is detected by the first output current detector, and the current target value which is generated by the current target value generator be equal or substantially equal to each other, a second controller that performs PWM control on the second converter so as to make the magnitude of the output current, which is detected by the second output current detector, and the current target value which is generated by the current target value generator be equal or substantially equal to each other, an operation selector that operates only a selected one of the first converter and the second converter, a first transmitter that transmits, to an external apparatus, the current target value, which is generated by the current target value generator, or the magnitude of the output current, which is detected by the first output current detector, in a state in which only the first converter is operated, a first receiver that receives, from the external apparatus, a first correction value derived in accordance with contents transmitted from the first transmitter, a second transmitter that transmits, to the external apparatus, the current target value, which is generated by the current target value generator, or the magnitude of the output current, which is detected by the second output current detector, in a state in which only the second converter is operated, a second receiver that receives, from the external apparatus, a second correction value derived in accordance with contents transmitted from the second transmitter, a storage that stores the first correction value and the second correction value which are respectively received by the first receiver and the second receiver, a first corrector that corrects, with the first correction value stored in the storage, the magnitude of the output current or the current target value, which is used for the PWM control by the first controller, and a second corrector that corrects, with the second correction value stored in the storage, the magnitude of the output current or the current target value, which is used for the PWM control by the second controller.

With this configuration, one of the first converter and the second converter is able to be stopped. Therefore, the correction value to correct the magnitude of the output current or the current target value, which is used for the PWM control, is able to be obtained for each of the first converter and the second converter. As a result, variations in the output currents of the first converter and the second converter are able to be eliminated and design to account for the variations is not required, thus reducing the size of the switching power supply apparatus.

A switching power supply apparatus according to a preferred embodiment of the present invention may include an AD converter that converts the magnitudes of the output currents, which are respectively detected by the first output current detector and the second output current detector, into digital values, wherein the first transmitter and the second transmitter respectively transmit, to the external apparatus, the magnitudes of the output currents, which have been converted into the digital values by the AD converter, the first output current detector and the second output current detector respectively include variable gain amplifiers and amplify the magnitudes of the output currents with the variable gain amplifiers, and the first corrector and the second corrector respectively correct gains of the variable gain amplifiers with the first correction value and the second correction value.

With this configuration, the variations in the output currents of the first converter and the second converter are able to be eliminated and design to account for the variations is not required, thus reducing the size of the switching power supply apparatus.

A switching power supply apparatus according to a preferred embodiment of the present invention may include an AD converter that converts the current target value which is generated by the current target value generator into a digital value, wherein the first transmitter and the second transmitter respectively transmit, to the external apparatus, the current target values which have been converted into the digital values by the AD converter, the first output current detector and the second output current detector respectively include variable gain amplifiers and amplify the magnitudes of the output currents with the variable gain amplifiers, and the first corrector and the second corrector respectively correct gains of the variable gain amplifiers with the first correction value and the second correction value.

With this configuration, the variations in the output currents of the first converter and the second converter are able to be eliminated and design to account for the variations is not required, thus reducing the size of the switching power supply apparatus.

A switching power supply apparatus according to a preferred embodiment of the present invention may include an AD converter that converts the magnitudes of the output currents, which are respectively detected by the first output current detector and the second output current detector, into digital values, wherein the first corrector and the second corrector respectively correct the magnitudes of the output currents, which have been converted into the digital values by the AD converter, using the first correction value and the second correction value, the first transmitter and the second transmitter respectively transmit, to the external apparatus, values corrected by the first corrector and the second corrector, and the storage updates the first correction value and the second correction value which are stored in the storage to the first correction value and the second correction value which are respectively received by the first receiver and the second receiver.

With this configuration, the magnitudes of the output currents are converted into the digital values for correction, thus reducing the number of circuit elements.

A switching power supply apparatus according to a preferred embodiment of the present invention may include an AD converter that converts the magnitudes of the output currents, which are respectively detected by the first output current detector and the second output current detector, into digital values, wherein the first transmitter and the second transmitter respectively transmit, to the external apparatus, the magnitudes of the output currents, which have been converted into the digital values by the AD converter, and the first corrector and the second corrector respectively correct, with the first correction value and the second correction value, the current target value which is used for the PWM control by the first controller and the current target value which is used for the PWM control by the second controller.

With this configuration, the variations in the output currents of the first converter and the second converter are able to be eliminated and design to account for the variations is not required, thus reducing the size of the switching power supply apparatus.

A switching power supply apparatus according to a preferred embodiment of the present invention may include a circuit that prohibits change of the first correction value and the second correction value which are stored in the storage.

This configuration prevents the risk of generation of the variations in the output currents of the first converter and the second converter due to changes of the first correction value and the second correction value.

An error correction method according to a preferred embodiment of the present invention, which is executed in a switching power supply apparatus including a first converter and a second converter that are connected in parallel, an output voltage detector that detects a magnitude of an output voltage, a current target value generator that generates a current target value from an error between the magnitude of the output voltage, which is detected by the output voltage detector, and a voltage target value, a first controller that performs PWM control on the first converter so as to make a magnitude of an output current of the first converter and the current target value which is generated by the current target value generator be equal to each other, and a second controller that performs PWM control on the second converter so as to make a magnitude of an output current of the second converter and the current target value which is generated by the current target value generator be equal to each other, includes generating a first current target value from the error between the output voltage and the voltage target value in a state in which only the first converter is operated, detecting the magnitude of the output current of the first converter in the state in which only the first converter is operated, transmitting, to an external apparatus, the first current target value or the magnitude of the output current of the first converter, receiving, from the external apparatus, a first correction value derived in accordance with the transmitted first current target value or the transmitted magnitude of the output current of the first converter, storing the received first correction value in a storage, generating a second current target value from the error between the output voltage and the voltage target value in a state in which only the second converter is operated, detecting the magnitude of the output current of the second converter in the state in which only the second converter is operated, transmitting, to the external apparatus, the second current target value or the magnitude of the output current of the second converter, receiving, from the external apparatus, a second correction value derived in accordance with the transmitted second current target value or the transmitted magnitude of the output current of the second converter, storing the received second correction value in the storage, correcting, with the first correction value, the magnitude of the output current or the current target value which is used for the PWM control by the first controller, and correcting, with the second correction value, the magnitude of the output current or the current target value which is used for the PWM control by the second controller.

With this method, one of the first converter and the second converter is stopped and the correction value to correct the magnitude of the output current or the current target value, which is used for the PWM control, is able to be obtained for each of the first converter and the second converter. As a result, variations in the output currents of the first converter and the second converter are able to be eliminated and design to account for the variations is not required, thus reducing the size of the switching power supply apparatus.

According to preferred embodiments of the present invention, variations in output currents are able to be corrected for each of a first converter and a second converter. As a result, variations in the output currents are able to be eliminated and design to account for the variations is not required, thus reducing the size of the switching power supply apparatus.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 1:
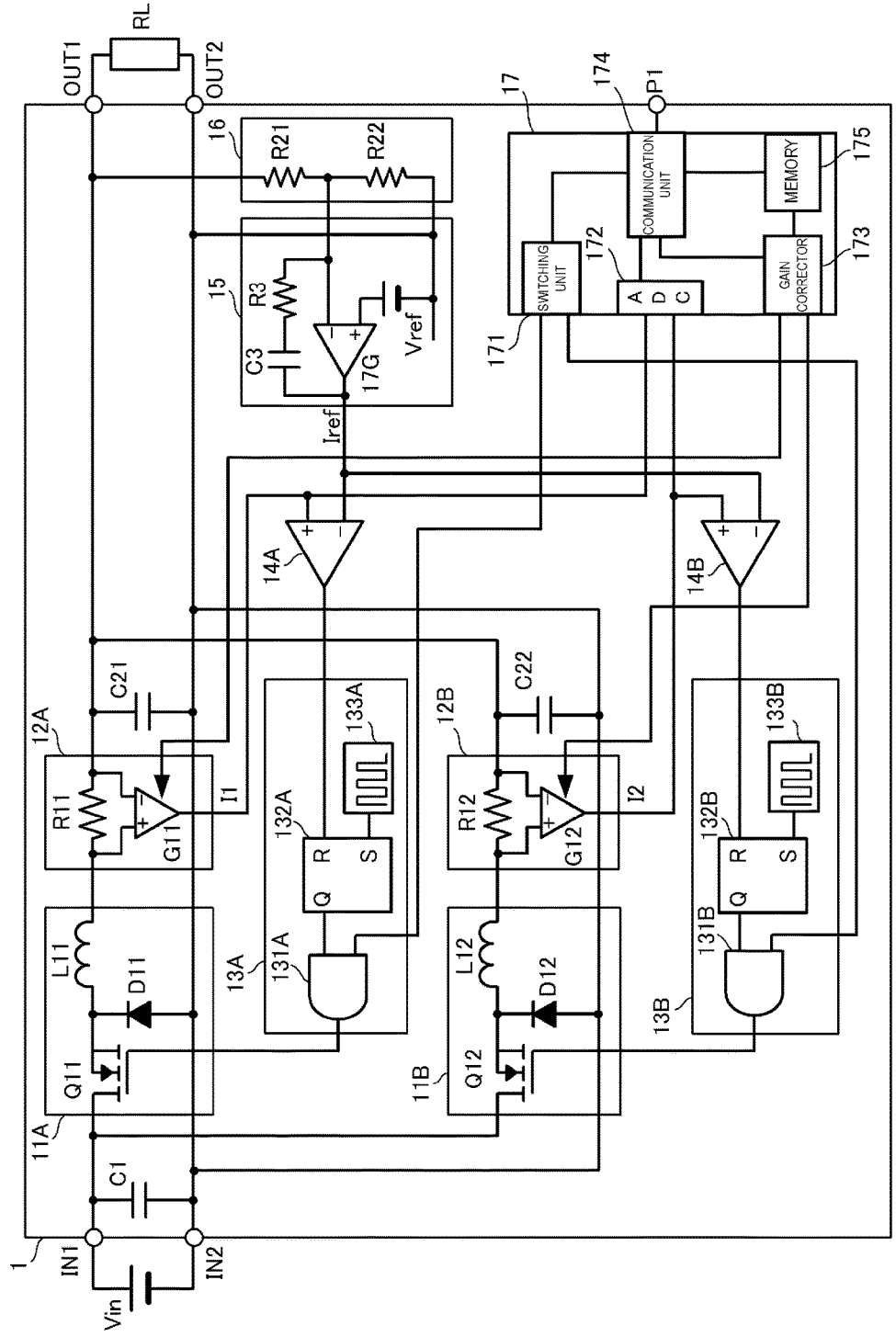
FIG. 1 is a circuit diagram of a switching power supply apparatus according to a first preferred embodiment of the present invention.

FIG. 1 is a circuit diagram of a switching power supply apparatus 1 according to a first preferred embodiment of the present invention.

The switching power supply apparatus 1 is a multi-phase type DC-to-DC converter that performs multi-phase control on a plurality of step-down converter circuits connected in parallel to step down voltages which are input from input portions IN1 and IN2 and output them from output portions OUT1 and OUT2. A direct-current (DC) power supply Vin is connected to the input portions IN1 and IN2. A load RL is connected to the output portions OUT1 and OUT2.

An input capacitor C1, a converter 11A, a current detection circuit 12A, and a smoothing capacitor C21 are connected in this order between the input portions IN1 and IN2 and the output portions OUT1 and OUT2. A series circuit of a converter 11B, a current detection circuit 12B, and a smoothing capacitor C22 is connected in parallel to a series circuit of the converter 11A, the current detection circuit 12A, and the smoothing capacitor C21.

The converters 11A and 11B are the step-down converter circuits including n-type MOS-FET switches Q11 and Q12, diodes D11 and D12, and inductors L11 and L12, respectively. PWM signal output portions 13A and 13B, which will be described later, are connected to gates of the switches Q11 and Q12, and gate signals are input thereto from the PWM signal output portions 13A and 13B.

The current detection circuits 12A and 12B respectively detect magnitudes of output currents of the converters 11A and 11B. The current detection circuit 12A corresponds to a "first output current detector". The current detection circuit 12B corresponds to a "second output current detector".

The current detection circuits 12A and 12B respectively include current detection resistors R11 and R12 and variable gain amplifiers G11 and G12. The variable gain amplifiers G11 and G12 respectively input both-end voltages of the current detection resistors R11 and R12, amplify them with gains set by a microcomputer 17, which will be described later, and output them. Signals that the variable gain amplifiers G11 and G12 output respectively correspond to the magnitudes of the output currents of the converters 11A and 11B. Hereinafter, the signals are referred to as detection current values I1 and I2. The detection current values I1 and I2 output from the current detection circuits 12A and 12B are respectively input to comparators 14A and 14B, which will be described later.

The switching power supply apparatus 1 includes the PWM signal outputs 13A and 13B, the comparators 14A and 14B, a voltage controller 15, a voltage detection circuit 16, and the microcomputer 17 as circuits that are configured and/or programmed to perform switching control on the converters 11A and 11B with good balance.

The voltage detection circuit 16 includes voltage dividing resistors R21 and R22 and detects the output voltages (to be specific, divided voltages thereof) from the output portions OUT1 and OUT2. A connection point between the voltage dividing resistors R21 and R22 is connected to the voltage controller 15. The voltage detection circuit 16 corresponds to an "output voltage detector".

The voltage controller 15 generates current target values Iref to make the output voltages detected by the voltage detection circuit 16 be equal or substantially equal to a reference voltage Vref. The reference voltage Vref corresponds to a voltage target value that the switching power supply apparatus 1 outputs. The converters 11A and 11B are controlled so as to output currents which are equal or substantially equal to the current target values Iref. The voltage controller 15 corresponds to a "current target value generator".

The voltage controller 15 includes a phase compensation circuit preferably including an error amplifier 17G, a capacitor C3, and a resistor R3. The reference voltage Vref is input to a non-inversion input terminal (+) of the error amplifier 17G and the output voltages (to be specific, the divided voltages thereof) detected by the voltage detection circuit 16 are input to the inversion input terminal (−) thereof. Output of the error amplifier 17G is fed back to the inversion input terminal (−) thereof after passing through the phase compensation circuit including the capacitor C3 and the resistor R3.

The error amplifier 17G amplifies errors between the voltages input to the respective input terminals and outputs them. Output signals from the error amplifier 17G are input to the comparators 14A and 14B as the current target values Iref which are output from each of the converters 11A and 11B, respectively.

The comparators 14A and 14B and the PWM signal output portions 13A and 13B respectively perform PWM control on the converters 11A and 11B such that the output currents from the converters 11A and 11B are equal or substantially equal to the current target values Iref. The comparator 14A and the PWM signal output portion 13A correspond to a "first controller". The comparator 14B and the PWM signal output portion 13B correspond to a "second controller".

The current target values Iref from the voltage controller 15 are respectively input to inversion input terminals (−) of the comparators 14A and 14B, and the detection current values I1 and I2 from the current detection circuits 12A and 12B are respectively input to the non-inversion input terminals (+) thereof. The comparators 14A and 14B compare the detection current values I1 and I2 and the current target values Iref with each other. The comparators 14A and 14B respectively output H-level signals to the PWM signal output portions 13A and 13B when the detection current values I1 and I2 are higher than the current target values Iref. The comparators 14A and 14B respectively output L-level signals to the PWM signal output portions 13A and 13B when the detection current values I1 and I2 are lower than the current target values Iref.

The PWM signal output portions 13A and 13B respectively include AND gates 131A and 131B, RS flip flops (RSFFs) 132A and 132B, and clock generators 133A and 133B. Outputs of the AND gates 131A and 131B are respectively connected to the gates of the switches Q11 and Q12 of the converters 11A and 11B. Q output terminals of the RSFFs 132A and 132B and a switching circuit 171 of the microcomputer 17 are connected to inputs of the AND gates 131A and 131B.

When L-level signals are input to the AND gates 131A and 131B from the switching circuit 171 of the microcomputer 17, the AND gates 131A and 131B output L-level signals. The switches Q11 and Q12 are thereby turned OFF. That is to say, the converters 11A and 11B do not operate. When H-level signals are input to the AND gates 131A and 131B from the switching circuit 171 of the microcomputer 17, the AND gates 131A and 131B output H-level signals or L-level signals output from the RSFFs 132A and 132B as they are. The switches Q11 and Q12 are thereby turned ON or OFF.

The clock generators 133A and 133B respectively output clock signals to the RSFFs 132A and 132B. The clock generators 133A and 133B generate the clock signals with different phases from each other.

Outputs of the comparators 14A and 14B are respectively connected to reset (R) terminals of the RSFFs 132A and 132B. The clock generators 133A and 133B are respectively connected to set (S) terminals of the RSFFs 132A and 132B and the clock signals are input thereto. The Q output terminals of the RSFFs 132A and 132B are respectively connected to the AND gates 131A and 131B.

Peak current mode control is performed in the PWM signal output portions 13A and 13B. When operations of the converters 11A and 11B are started, the detection current values I1 and I2 are lower than the current target values Iref and the L-level signals are therefore input to the R terminals of the RSFFs 132A and 132B from the comparators 14A and 14B. In this case, the RSFFs 132A and 132B output the H-level signals at the rising of the clock signals which are input to the S terminals. The AND gates 131A and 131B output the H-level signals.

When the detection current values I1 and I2 become higher than the current target values Iref, the H-level signals are input to the R terminals of the RSFFs 132A and 132B from the comparators 14A and 14B. At this time, an RSFF the RSFFs 132A and 132B are reset. That is to say, the AND gates 131A and 131B output the L-level signals.

The PWM signal output portions 13A and 13B perform the PWM control on the switches Q11 and Q12 by repeating the operations.

The microcomputer 17 is configured and/or programmed to include the switching circuit 171, an ADC 172, a gain corrector 173, a communicator 174, and a memory 175. The communicator 174 communicates with a measurement tool (external apparatus) which is connected to a port P1 and corresponds to a "first transmitter", a "first receiver", a "second transmitter", and a "second receiver".

The switching circuit 171 stops operation of any one of the converter 11A and 11B in accordance with a signal received by the communicator 174 from the measurement tool. When the operation of the converter 11A is stopped, the switching circuit 171 outputs the L-level signal to the AND gate 131A of the PWM signal output portion 13A and outputs the H-level signal to the AND gate 131B of the PWM signal output portion 13B. When the operation of the converter 11B is stopped, the switching circuit 171 outputs the L-level signal to the AND gate 131B of the PWM signal output portion 13B and outputs the H-level signal to the AND gate 131A of the PWM signal output portion 13A. The switching circuit 171 and the AND gates 131A and 131B correspond to an "operation selector".

The ADC 172 is an analog-to-digital converter. The ADC 172 samples the detection current values I1 and I2 from the current detection circuits 12A and 12B and converts them into digital values. The communicator 174 transmits the digital values of the detection current values I1 and I2, which have been converted by the ADC 172, to the measurement tool connected to the port P1.

The measurement tool which has received the detection current values I1 and I2 determines a correction value (first correction value) to correct a gain set to the variable gain amplifier G11 and a correction value (second correction value) to correct a gain set to the variable gain amplifier G12. The measurement tool transmits the determined correction values to the switching power supply apparatus 1. When the switching power supply apparatus 1 receives the correction values from the measurement tool, it stores them in the memory 175. The memory 175 corresponds to a "storage".

The gain corrector 173 corrects the gains set to the respective variable gain amplifiers G11 and G12 with the correction values stored in the memory 175. The variable gain amplifiers G11 and G12 respectively amplify the both-end voltages of the current detection resistors R11 and R12 with the gains after the correction and output them. The gain corrector 173 corresponds to a "first corrector" and a "second corrector".

Hereinafter, a non-limiting example of a method of determining the correction values and correcting the gains with the determined correction values will be described. The determination of the correction values is performed before the switching power supply apparatus 1 is shipped from a factory. The determined correction values are stored in the memory 175. The gain corrector 173 corrects the gains set to the respective variable gain amplifiers G11 and G12 with the correction values stored in the memory 175 after the shipping from the factory.

When the correction value (first correction value) for the variable gain amplifier G11 is determined, the switching circuit 171 outputs the L-level signal to the AND gate 131B to stop the operation of the converter 11B.

The converter 11A is operated and the current detection circuit 12A detects the output current from the converter 11A in a state in which a load RL is set to a load to correct the gain. The detection current value I1 output from the current detection circuit 12A is transmitted to the measurement tool. The load to correct the gain is a rated load, a maximum load, or other suitable load and is determined based on applications of the converter, usage conditions thereof, and other factors.

The measurement tool determines whether or not the detection current value I1 is a proper value for the set load RL and when it is not the proper value, the correction value to correct the gain of the variable gain amplifier G11 is determined. The correction value may be the gain which is set to the variable gain amplifier G11 or an adjustment value to adjust the gain by adding or subtracting it to or from the already set gain.

The correction value determined by the measurement tool is transmitted to the switching power supply apparatus 1 and is stored in the memory 175.

The gain corrector 173 corrects the gain set to the variable gain amplifier G11 with the correction value stored in the memory 175.

The operations described above are repeated until the measurement tool determines that the detection current value I1 is the proper value.

With the above-described processing, the correction value for the gain of the variable gain amplifier G11 is determined.

It should be noted that the correction value received from the measurement tool may not be stored in the memory 175 and the gain corrector 173 may correct the gain with the correction value received directly from the measurement tool. In this case, when the detection current value I1 is determined to be the proper value, the correction value determined at this time may be stored in the memory 175.

When the correction value (second correction value) for the gain of the variable gain amplifier G12 is determined, the switching circuit 171 outputs the L-level signal to the AND gate 131A to stop the operation of the converter 11A. Then, the same operations as those described above are performed.

After the shipping from the factory, the gain corrector 173 reads the correction values stored in the memory 175 and corrects the gains of the respective variable gain amplifiers G11 and G12 with the correction values when the switching power supply apparatus 1 is activated.

It should be noted that the microcomputer 17 (invalidator) may preferably be configured and/or programmed to prohibit writing into the memory 175 so as to prevent the correction values from being changed after the shipping from the factory. For example, the microcomputer 17 may be configured and/or programmed to allow the stored correction values to be changed only when passwords are transmitted. Various apparatuses other than the measurement tool are connected to the port P1 in some cases. Therefore, an erroneous change of storage contents in the memory 175 by the connected apparatuses causes a malfunction of the switching power supply apparatus 1. The malfunction is able to be prevented by preventing the correction values from being changed.

As described above, the switching power supply apparatus 1 is able to stop one of the converters 11A and 11B connected in parallel. Therefore, the predetermined correction values are able to be obtained for the respective current detection circuits 12A and 12B. Accordingly, the respective characteristics of the current detection circuits 12A and 12B are able to be individually adjusted, thus preventing variations in the respective characteristics. As a result, variations in the output currents of the respective converters 11A and 11B are able to be prevented and design to account for the variations is not required, thus reducing the size of the switching power supply apparatus 1.

Although the gain corrector 173 preferably corrects the respective gains of the variable gain amplifiers G11 and G12 in the present preferred embodiment, offsets of the respective variable gain amplifiers G11 and G12 may be corrected. Alternatively, both of the gains and the offsets may be corrected.

Second Preferred Embodiment

Figure 2:
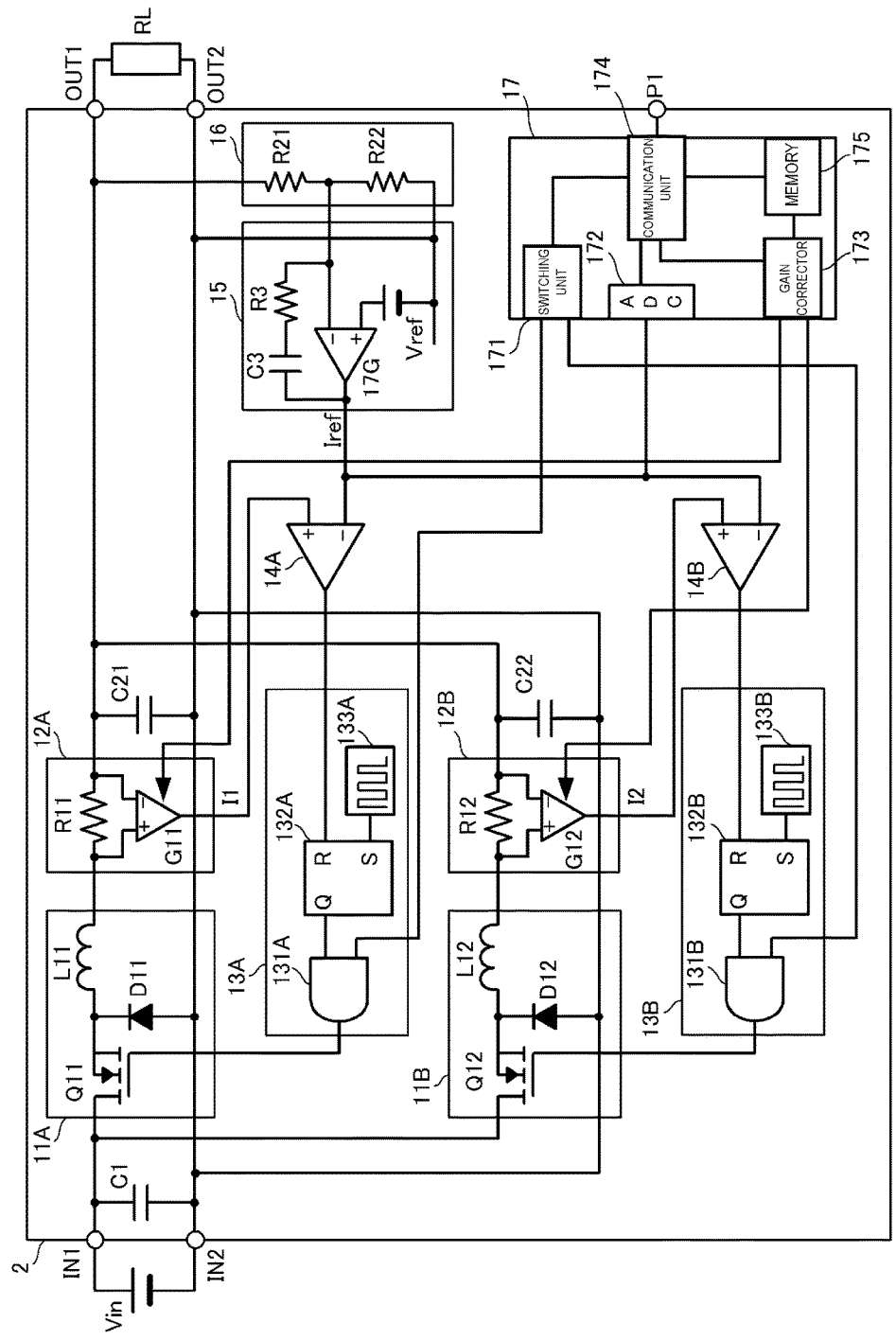
FIG. 2 is a circuit diagram of a switching power supply apparatus according to a second preferred embodiment of the present invention.

FIG. 2 is a circuit diagram of a switching power supply apparatus 2 according to a second preferred embodiment of the present invention. It should be noted that the same reference numerals denote the same circuits, elements, and other components as those in the first preferred embodiment and description thereof is omitted.

The switching power supply apparatus 1 in the first preferred embodiment transmits the detection current values I1 and from the current detection circuits 12A and 12B to the measurement tool connected to the port P1. In contrast, the switching power supply apparatus 2 in the second preferred embodiment transmits the current target values Iref from the voltage controller 15 to the measurement tool.

More specifically, output of the error amplifier 17G is connected to the ADC 172 of the microcomputer 17. The ADC 172 converts the current target values Iref from the error amplifier 17G into digital values. The communicator 174 transmits the digital values of the current target values Iref to the external measurement tool.

The measurement tool determines correction values based on the current target values Iref. When a correction value (first correction value) for the variable gain amplifier G11 is determined, the voltage controller 15 generates the current target value Iref and transmits it to the measurement tool in a state in which operation of the converter 11B is stopped. The measurement tool determines whether or not the current target value Iref is a proper value for the set load RL and determines the correction value. The same operations are also performed when a correction value (second correction value) for the variable gain amplifier G12 is determined.

Also when the correction values are determined based on the current target values Iref, the correction values for the respective current detection circuits 12A and 12B are able to be obtained as in the first preferred embodiment. Variations in the output currents of the respective converters 11A and 11B are able to be prevented and design to account for the variations is not required, thus reducing the size of the switching power supply apparatus 2. In the present preferred embodiment, it is sufficient that the ADC 172 includes one port and the number of ports may be reduced in comparison with that in the first preferred embodiment.

Third Preferred Embodiment

Figure 3:
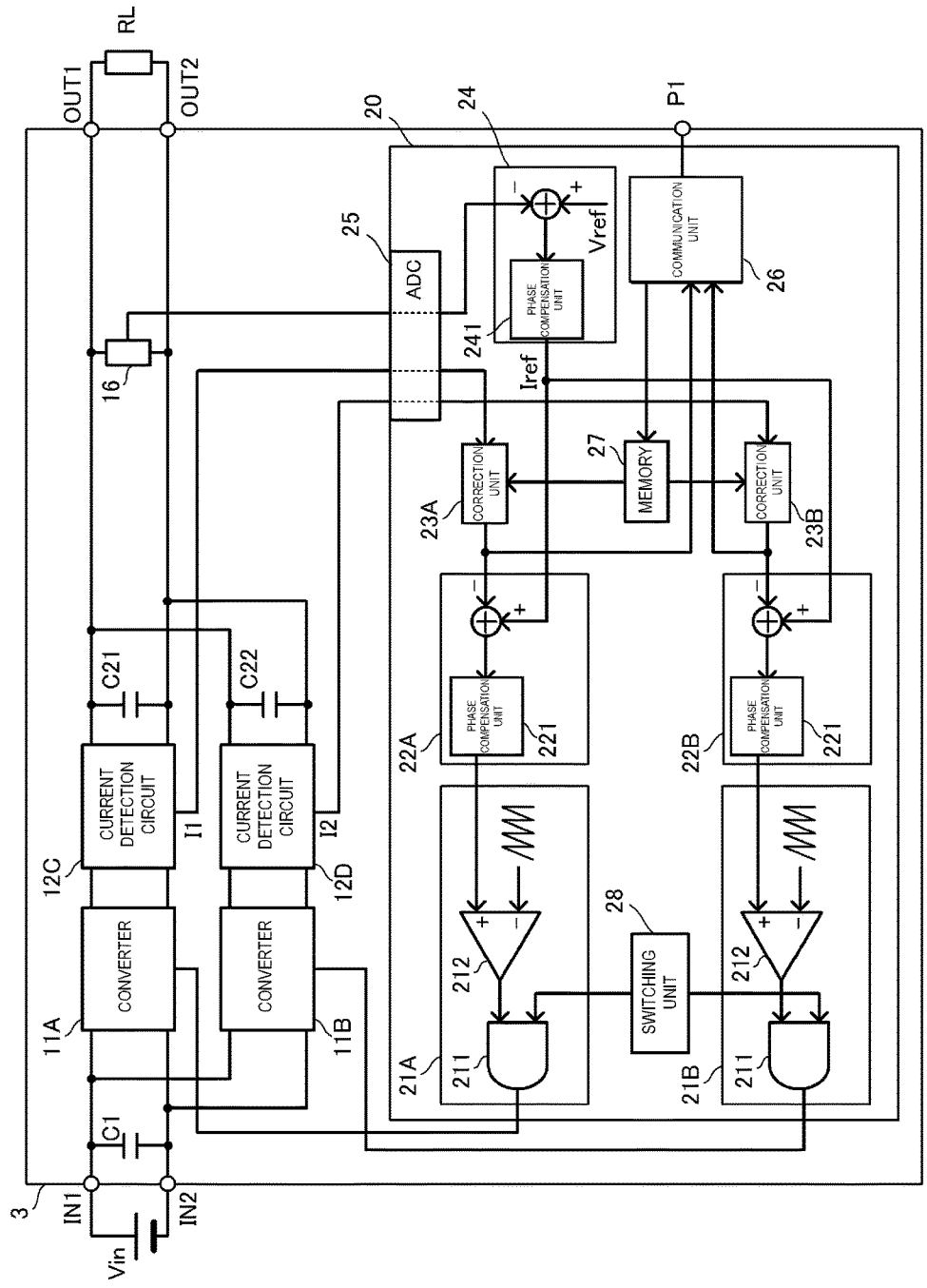
FIG. 3 is a circuit diagram of a switching power supply apparatus according to a third preferred embodiment of the present invention.

FIG. 3 is a circuit diagram of a switching power supply apparatus 3 according to a third preferred embodiment of the present invention. It should be noted that the same reference numerals denote the same circuits, elements, and other components as those in the first and second preferred embodiments and description thereof is omitted.

The input capacitor C1, the converter 11A, a current detection circuit 12C, and the smoothing capacitor C21 are connected in this order between the input portions IN1 and IN2 and the output portions OUT1 and OUT2. The converter 11B, a current detection circuit 12D, and the smoothing capacitor C22 are connected in parallel to a series circuit of the converter 11A, the current detection circuit 12C, and the smoothing capacitor C21. The current detection circuits 12C and 12D respectively detect output currents of the converters 11A and 11B.

The switching power supply apparatus 3 includes a microcomputer (DSP) 20. Although illustrated with blocks in FIG. 3, the following processing is performed by arithmetic processing by the microcomputer 20, which is configured and/or programmed to provide the following functional elements and processes.

The microcomputer 20 is configured and/or programmed to include an ADC 25 to convert respective detection results from the respective current detection circuits 12C and 12D into digital values, and correct the converted results. The microcomputer 20 is configured and/or programmed to perform PWM control on the converters 11A and 11B based on the corrected results.

The current detection circuits 12C and 12D respectively have the same or substantially the same configurations as those of the current detection circuits 12A and 12B described in the first and second preferred embodiments and include current detection resistors and gain amplifiers. The gain amplifiers preferably do not have a variable gain function. The current detection circuits 12A and 12B in the first and second preferred embodiments preferably respectively include the variable gain amplifiers G11 and G12. By contrast, in the present preferred embodiment, detection results by the current detection circuits 12C and 12D are converted into the digital values and the digital values are corrected. Therefore, it is sufficient that the current detection circuits 12C and 12D include amplifiers which do not have the variable gain function.

Hereinafter, it is assumed that an output signal of the current detection circuit 12C is the detection current value I1 and an output signal of the current detection circuit 12D is the detection current value I2.

The microcomputer 20 is configured and/or programmed to include PWM signal output portions 21A and 21B, current controllers 22A and 22B, correctors 23A and 23B, a voltage controller 24, the ADC 25, a communicator 26, a memory 27, and a switching circuit 28.

The ADC 25 converts the detection current values I1 and I2 from the current detection circuits 12C and 12D and output voltage values detected by the voltage detection circuit 16 into digital values.

The voltage controller 24 includes a phase compensator 241. The phase compensator 241 outputs (phase-compensated) values ensuring stable operation of a system in accordance with errors between the digital values of the output voltage values detected by the voltage detection circuit 16 and the reference voltage Vref. The values are respectively input as the current target values Iref to the current controllers 22A and 22B. The voltage controller 24 corresponds to a "current target value generator".

The correctors 23A and 23B respectively correct digital values of the detection current values I1 and I2 using correction values stored in the memory 27. The communicator 26 transmits the digital values of the detection current values I1 and I2 after the correction to the measurement tool connected to the port P1. The corrector 23A corresponds to a "first corrector" and the corrector 23B corresponds to a "second corrector".

The measurement tool determines the correction values which are used by the corrector 23A and 23B as in the description of the first preferred embodiment. The measurement tool transmits the determined correction values to the switching power supply apparatus 3. The correction values are stored in the memory 27.

The current controllers 22A and 22B include phase compensators 221. The phase compensators 221 output (phase-compensated) values ensuring stable operations of systems in accordance with errors between the current target values Iref and the corrected digital values of the detection current values I1 and I2. The values are respectively input as duties of PWM signals to the PWM signal output portions 21A and 21B.

The PWM signal output portions 21A and 21B include AND gates 211 and comparators 212. Output of the AND gate 211 of the PWM signal output portion 21A is connected to the gate of the switch Q11 (see FIG. 1) of the converter 11A. Output of the AND gate 211 of the PWM signal output portion 21B is connected to the gate of the switch Q12 (see FIG. 1) of the converter 11B. The switching circuit 28 is connected to inputs of the respective AND gates 211.

As described in the first preferred embodiment, when the L-level signals are input from the switching circuit 28, the AND gates 211 can output L-level signals (0) to the gates of the switches Q11 and Q12 and turn OFF the switches Q11 and Q12. That is to say, the operations of the converters 11A and 11B are able to be selectively stopped.

The current controllers 22A and 22B are connected to non-inversion input terminals (+) of the comparators 212 and counter values are input to inversion input terminals (−) thereof. The comparators 212 compare signals from the current controllers 22A and 22B and the counter values with each other and generate PWM signals of duties in accordance with the comparison results. The PWM signals are input to the gates of the switches Q11 and Q12 from the AND gates 211.

The current controller 22A and the PWM signal output portion 21A correspond to a "first controller". The current controller 22B and the PWM signal output portion 21B correspond to a "second controller". The switching circuit 28 and the AND gates 211 correspond to an "operation selector".

As described above, also when the microcomputer 20 performs the PWM control on the converters 11A and 11B, the correction values for the respective current detection circuits 12C and 12D are able to be obtained as in the first preferred embodiment. Variations in the output currents of the respective converters 11A and 11B are able to be prevented and design to account for the variations is not required, thus reducing the size of the switching power supply apparatus 3. Furthermore, the number of elements is able to be reduced in comparison to that in the first preferred embodiment.

Fourth Preferred Embodiment

Figure 4:
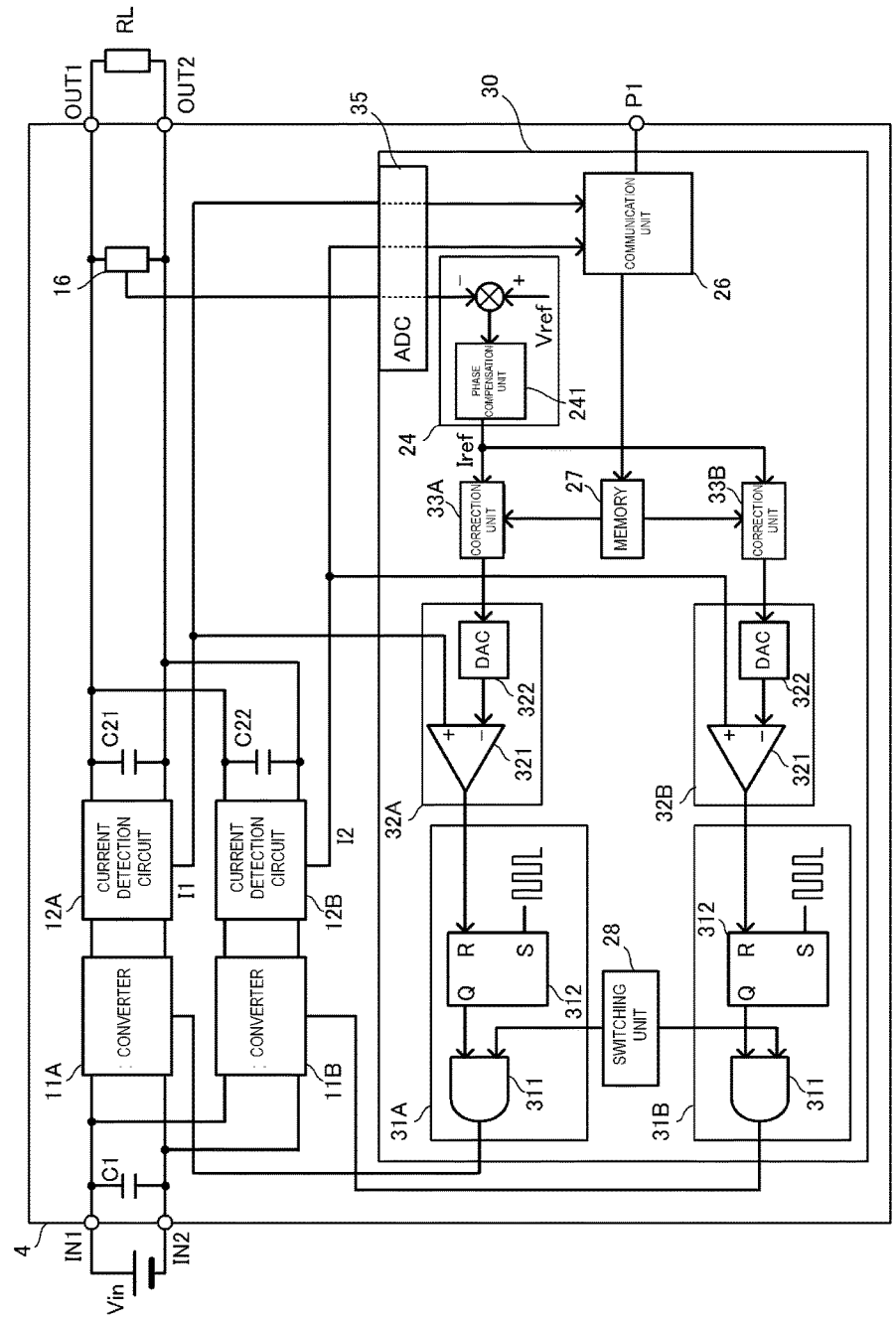
FIG. 4 is a circuit diagram of a switching power supply apparatus according to a fourth preferred embodiment of the present invention.

FIG. 4 is a circuit diagram of a switching power supply apparatus 4 according to a fourth preferred embodiment of the present invention. In the fourth preferred embodiment, the configuration and/or programming of a microcomputer 30 included in the switching power supply apparatus 4 is different from that in the third preferred embodiment.

The microcomputer 30 is configured and/or programmed to include PWM signal outputs 31A and 31B, current controllers 32A and 32B, correctors 33A and 33B, the voltage controller 24, the ADC 35, the communicator 26, the memory 27, and the switching circuit 28. The correctors 33A and 33B, the voltage controller 24, the ADC 35, the communicator 26, the memory 27, and the switching circuit 28 are preferably the same or substantially the same as those in the third preferred embodiment.

The microcomputer 30 is configured and/or programmed to convert respective detection results from the respective current detection circuits 12A and 12B into digital values by the ADC 25, and to correct the converted results. The microcomputer 30 is configured and/or programmed to transmit the taken digital values to a measurement tool which is connected to the port P1 by the communicator 26.

The measurement tool determines correction values which are used by the correctors 23A and 23B as in the description of the first preferred embodiment. The measurement tool transmits the determined correction values to the switching power supply apparatus 4. The correction values are stored in the memory 27.

The correctors 33A and 33B respectively correct the current target values Iref which are output from the voltage controller 24 using the correction values stored in the memory 27. The corrector 33A corresponds to a "first corrector" and the corrector 33B corresponds to a "second corrector".

The current controllers 32A and 32B include comparators 321 and DACs 322. The DACs 322 convert the digital values of the current target values Iref after the correction by the correctors 33A and 33B into analog values. Outputs of the DACs 322 are input to inversion input terminals (−) of the comparators 321.

The detection current values I1 and I2 from the current detection circuits 12A and 12B are respectively input to non-inversion input terminals (+) of the comparators 321. The comparators 321 compare the detection current values I1 and I2 with the current target values Iref after the correction. The comparators 321 respectively output H-level signals to the PWM signal output portions 31A and 31B when the detection current values I1 and I2 are higher than the current target values Iref. The comparators 321 respectively output L-level signals to the PWM signal output portions 31A and 31B when the detection current values I1 and I2 are lower than the current target values Iref.

The PWM signal output portions 31A and 31B are preferably the same or substantially the same as those of the PWM signal output portions 13A and 13B described in the first and second preferred embodiments and description thereof is omitted.

The current controller 32A and the PWM signal output portion 31A correspond to a "first controller". The current controller 32B and the PWM signal output portion 31B correspond to a "second controller".

Also in the present preferred embodiment, the correction values for the respective current detection circuits 12A and 12B are able to be obtained as in the first preferred embodiment. Variations in the output currents of the respective converters 11A and 11B are able to be prevented and design to account for the variations is not required, thus reducing the size of the switching power supply apparatus 4.

In the present preferred embodiment, the current controllers 32A and 32B use the analog comparators 321. It is difficult to monitor the output currents of the converters 11A and 11B at all times, compare them with the current target values Iref, and invert the PWM signals at timings when the output currents and the current target values Iref are identical or substantially identical to each other because digital conversion and other processing by an ADC 35 requires processing time. For this reason, usage of the analog comparators enables the PWM control to be performed on the converters 11A and 11B with high accuracy.

Although the switching power supply apparatus preferably includes the two converters (first converter and second converter) in each of the first to fourth preferred embodiments, the number of converters may be equal to or more than three.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power supply apparatus comprising:
    a first converter and a second converter that are connected in parallel;
    an output voltage detector that detects a magnitude of an output voltage;
    a current target value generator that generates a current target value from an error between the magnitude of the output voltage, which is detected by the output voltage detector, and a voltage target value;
    a first output current detector that detects a magnitude of an output current of the first converter;
    a second output current detector that detects a magnitude of an output current of the second converter;
    a first controller that performs PWM control on the first converter to make the magnitude of the output current, which is detected by the first output current detector, and the current target value which is generated by the current target value generator, be equal or substantially equal to each other;
    a second controller that performs PWM control on the second converter to make the magnitude of the output current, which is detected by the second output current detector, and the current target value which is generated by the current target value generator, be equal or substantially equal to each other;
    an operation selector that operates only a selected one of the first converter and the second converter;
    a first transmitter that transmits, to an external apparatus, the current target value, which is generated by the current target value generator, and the magnitude of the output current, which is detected by the first output current detector, in a state in which only the first converter is operated;
    a first receiver that receives, from the external apparatus, a first correction value derived in accordance with contents transmitted from the first transmitter;
    a second transmitter that transmits, to the external apparatus, the current target value, which is generated by the current target value generator, and the magnitude of the output current, which is detected by the second output current detector, in a state in which only the second converter is operated;
    a second receiver that receives, from the external apparatus, a second correction value derived in accordance with contents transmitted from the second transmitter;
    a storage that stores the first correction value and the second correction value which are respectively received by the first receiver and the second receiver;
    a first corrector that corrects, with the first correction value stored in the storage, the magnitude of the output current or the current target value, which is used for the PWM control by the first controller; and
    a second corrector that corrects, with the second correction value stored in the storage, the magnitude of the output current or the current target value, which is used for the PWM control by the second controller.

2. The switching power supply apparatus according to claim 1, further comprising:
    an AD converter that converts the magnitudes of the output currents, which are respectively detected by the first output current detector and the second output current detector, into digital values; wherein
    the first transmitter and the second transmitter respectively transmit, to the external apparatus, the magnitudes of the output currents, which have been converted into the digital values by the AD converter;
    the first output current detector and the second output current detector respectively include variable gain amplifiers and amplify the magnitudes of the output currents with the variable gain amplifiers; and the first corrector and the second corrector respectively correct gains of the variable gain amplifiers with the first correction value and the second correction value.

3. The switching power supply apparatus according to claim 1, further comprising:
an AD converter that converts the current target value which is generated by the current target value generator into a digital value; wherein
the first transmitter and the second transmitter respectively transmit, to the external apparatus, the current target values which have been converted into the digital values by the AD converter;
the first output current detector and the second output current detector respectively include variable gain amplifiers and amplify the magnitudes of the output currents with the variable gain amplifiers; and
the first corrector and the second corrector respectively correct gains of the variable gain amplifiers with the first correction value and the second correction value.

4. The switching power supply apparatus according to claim 1, further comprising:
an AD converter that converts the magnitudes of the output currents, which are respectively detected by the first output current detector and the second output current detector, into digital values; wherein
the first corrector and the second corrector respectively correct the magnitudes of the output currents, which have been converted into the digital values by the AD converter, using the first correction value and the second correction value;
the first transmitter and the second transmitter respectively transmit, to the external apparatus, values corrected by the first corrector and the second corrector; and
the storage updates the first correction value and the second correction value which are stored in the storage to the first correction value and the second correction value which are respectively received by the first receiver and the second receiver.

5. The switching power supply apparatus according to claim 1, further comprising:
an AD converter that converts the magnitudes of the output currents, which are respectively detected by the first output current detector and the second output current detector, into digital values; wherein
the first transmitter and the second transmitter respectively transmit, to the external apparatus, the magnitudes of the output currents, which have been converted into the digital values by the AD converter; and
the first corrector and the second corrector respectively correct, with the first correction value and the second correction value, the current target value which is used for the PWM control by the first controller and the current target value which is used for the PWM control by the second controller.

6. The switching power supply apparatus according to claim 1, further comprising a circuit that prohibits changes of the first correction value and the second correction value which are stored in the storage.

7. The switching power supply apparatus according to claim 1, wherein the first converter is a step-down converter circuit including n-type MOS-FET switches, diodes, and inductors.

8. The switching power supply apparatus according to claim 1, wherein the second converter is a step-down converter circuit including n-type MOS-FET switches, diodes, and inductors.

9. The switching power supply apparatus according to claim 1, wherein the first output current detector includes current detection resistors and variable gain amplifiers.

10. The switching power supply apparatus according to claim 1, wherein the second output current detector includes current detection resistors and variable gain amplifiers.

11. The switching power supply apparatus according to claim 1, wherein the output voltage detector includes voltage dividing resistors.

12. The switching power supply apparatus according to claim 1, wherein the current target value generator includes a voltage controller.

13. The switching power supply apparatus according to claim 12, wherein the voltage controller includes a phase compensation circuit defined by an error amplifier, a capacitor, and a resistor.

14. The switching power supply apparatus according to claim 1, wherein the first controller includes a comparator and a PWM signal output.

15. The switching power supply apparatus according to claim 1, wherein the second controller includes a comparator and a PWM signal output.

16. An error correction method, which is executed in a switching power supply apparatus including a first converter and a second converter that are connected in parallel, an output voltage detector that detects a magnitude of an output voltage, a current target value generator that generates a current target value from an error between the magnitude of the output voltage, which is detected by the output voltage detector, and a voltage target value, a first controller that performs PWM control on the first converter to make a magnitude of an output current of the first converter and the current target value which is generated by the current target value generator be equal or substantially equal to each other, and a second controller that performs PWM control on the second converter to make a magnitude of an output current of the second converter and the current target value which is generated by the current target value generator be equal or substantially equal to each other, the error correction method comprising:
generating a first current target value from the error between the output voltage and the voltage target value in a state in which only the first converter is operated;
detecting the magnitude of the output current of the first converter in the state in which only the first converter is operated;
transmitting, to an external apparatus, the first current target value and the magnitude of the output current of the first converter;
receiving, from the external apparatus, a first correction value derived in accordance with the transmitted first current target value or the transmitted magnitude of the output current of the first converter;
storing the received first correction value in a storage;
generating a second current target value from the error between the output voltage and the voltage target value in a state in which only the second converter is operated;
detecting the magnitude of the output current of the second converter in the state in which only the second converter is operated;
transmitting, to the external apparatus, the second current target value and the magnitude of the output current of the second converter;
receiving, from the external apparatus, a second correction value derived in accordance with the transmitted second current target value or the transmitted magnitude of the output current of the second converter;

storing the received second correction value in the storage;

correcting, with the first correction value, the magnitude of the output current or the current target value which is used for the PWM control by the first controller; and correcting, with the second correction value, the magnitude of the output current or the current target value which is used for the PWM control by the second controller.

17. The error correction method according to claim 16, further comprising prohibiting changes of the first correction value and the second correction value which are stored in the storage.

* * * * *